2,514,791

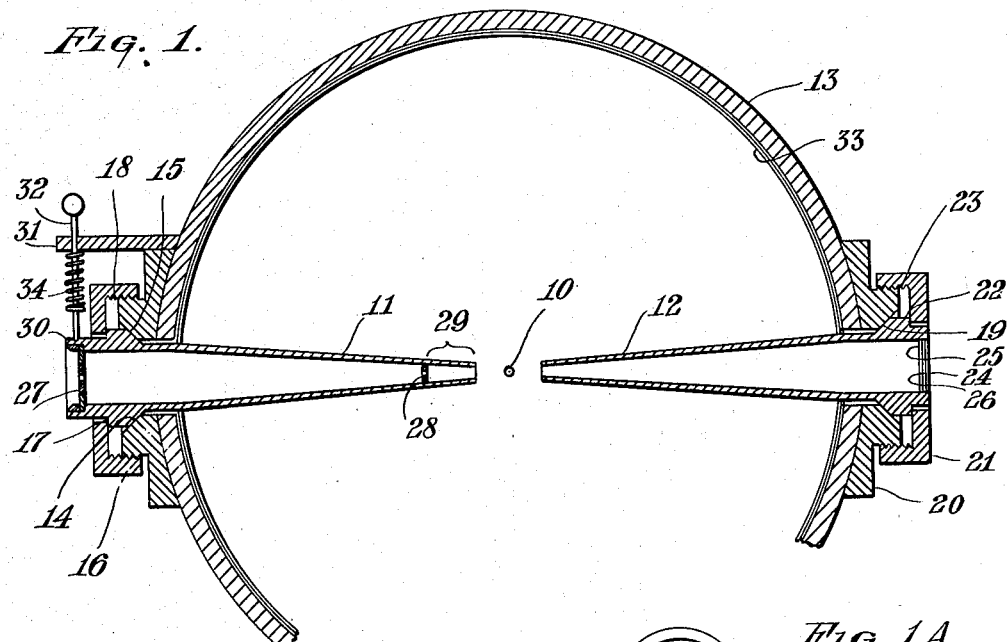
Fig. 1.
Fig. 1A.
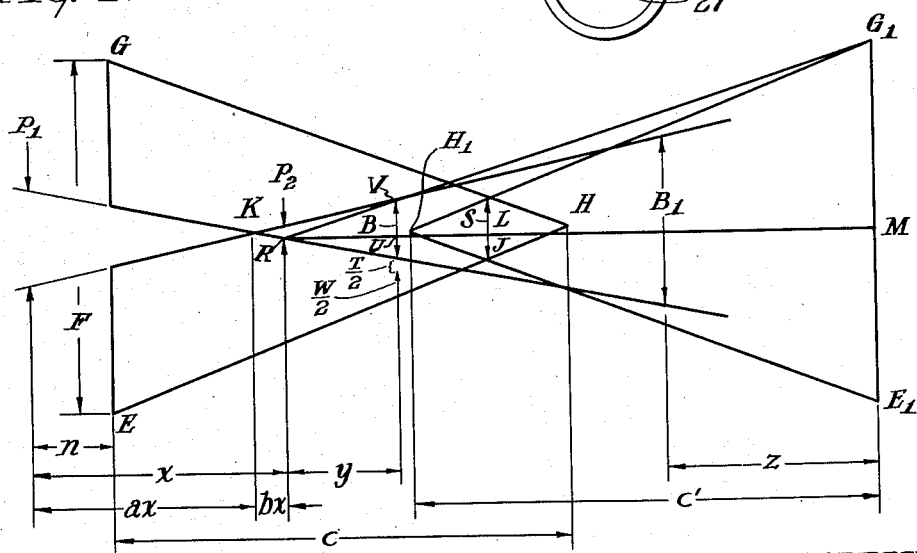
Fig. 2.
WILLIAM PARRISH
EVELYN A. GISNEY
INVENTORS
BY
AGENT Patented July 11, 1950

UNITED STATES PATENT OFFICE 2,514,791

X-RAY COLLIMATING SYSTEM

William Parrish, Hastings, and Evelyn A. Cisney, Tarrytown, N. Y., assignors to Philips Laboratories, Inc., Irvington on Hudson, N. Y.

Application February 15, 1947, Serial No. 728,828

3 Claims. (Cl. 250—53)

The invention relates to collimating systems for X-ray diffraction analysis. In particular, the invention is directed to improved collimating systems for X-ray powder diffraction cameras and will be described in connection with an X-ray powder camera.

In general, X-ray collimating systems are designed to provide a localized beam of X-radiation for X-ray diffraction analysis. These X-ray collimating systems have been used to a large extent in X-ray powder cameras although they have not been particularly limited in their range of usefulness to such X-ray equipment. When an X-ray collimating system is employed in an X-ray powder camera, it provides a means for directing a narrowly localized beam of X-radiation at a specimen of material in order that a diffraction pattern of the specimen is obtained on a film or other suitable X-ray detection device.

In this connection, the general design principles of X-ray powder diffraction cameras employing X-ray collimating systems have been discussed by M. J. Buerger in an article entitled "The Design of X-ray Powder Cameras" in the Journal of Applied Physics, vol. 16, 1945, pages 501–510. However, it is known that in general, X-ray diffraction photographs obtained with X-ray powder diffraction cameras employing any of the known X-ray collimating systems have certain inherent disadvantages and it is further known that poor film registry is a result of faulty collimating system design. The disadvantages that result as a use of an improperly designed X-ray collimating system are, excessive air-scatter, poor resolution, low intensity, unreliable relative intensities, no film registry of diffraction patterns at very low and very high angles, and X-ray scatter and/or Laue spots on the film from parts of the camera other than the specimen.

It is an object of the invention to provide an X-ray collimating system for obtaining optimum results for X-ray diffraction studies.

It is a further object of the invention to provide an X-ray collimating system which will produce X-ray diffraction patterns displaying good resolution, reduce air scatter, increase the intensity of the pattern, improve relative intensities, record patterns at very low and very high angles, and eliminate X-ray scatter and/or Laue spots from parts of the camera other than the specimen.

It is a still further object of the invention to evolve the basic design information of a superior collimating system.

It is a still further object of the invention to effect a relatively simplified design of a collimating system for use in X-ray cameras.

It is a still further object of the invention to design a collimator system for an X-ray powder camera which has easily reproducible alignment and is mechanically simple.

And yet another object of the invention is to provide novel and superior designs of collimating systems for X-ray powder cameras.

These and further objects of the invention will become readily apparent from an inspection of the drawing forming a part of this specification and the detailed description which follows.

According to the invention, the foregoing objects are achieved by improved designs of X-ray collimating systems. More specifically, the collimator system comprises a tapered collimator tube provided with correctly spaced partitions impervious to X-radiation which partitions are provided with apertures for permitting a sharply localized beam of X-radiation to pass through the tube and a tapered exit tube for allowing the primary radiation to escape without registering the detection device. The spacing of the partitions in the collimator are determined by the nature of the specimen to be analyzed and the length of the collimator tube so that an intense beam of radiation is focussed at the specimen and the portion of the tube between the partition nearest the specimen and the specimen end of the tube forms a scatter cup for absorbing undesired radiation.

We have found that in order to obtain diffraction patterns displaying good resolution, high intensities, better relative intensities, reduced air scatter, and the elimination of X-ray scatter and/or Laue spots arising from the reflection of X-radiation from parts of the camera other than the specimen, certain design criteria for the collimating system must be met. We have effectively solved the problem for any type of collimating system for any X-ray camera used in X-ray diffraction analysis and the generalized solution of the problem is given in the form of a system of equations which when solved yield the proper spacing of the above-mentioned partitions, the location of the partition within the collimating tube nearest the specimen, and the diameter of the X-ray beam at the tip of the collimator for best diffraction patterns. The design of the exit tube is also given as a solution of a system of equations which when solved yield the length of the exit tube and the beam diameter at the tip of the exit tube nearest the specimen. By a proper correlation of these factors, obtained as a solution of a generalized system of equations, the overall design of the system will produce a superior collimating system.

In order that the invention can be readily understood and carried into effect, it will now be described with reference to the accompanying drawing in which:

Fig. 1 is a partial cross-sectional view of an X-ray powder camera embodying a collimating system according to the invention;

Fig. 1A is a partial end view of the collimator showing a partition impervious to X-radiation provided with a slotted aperture; and Fig. 2 is an analytical diagram illustrating the mathematical analysis leading to the general equations embodying the design of the collimator system.

Referring more particularly to Fig. 1 in the drawing, a specimen 10 is located on a support (not shown) centrally positioned in a powder camera 13 which holds a film 33 sensitive to X-radiation on the inner peripheral wall thereof. The specimen is positioned between a collimator tube 11 and an exit port tube assembly 12 which extend axially through opposite openings in the camera wall 13 and are provided to direct a sharply defined beam of X-radiation at the specimen and to allow direct radiation passing through the specimen to leave the camera without secondary effects such as back-scattering and reflection from the wall of the camera, respectively.

Collimator 11 is in the form of a tapered tube for that portion which extends into the camera and is provided with a circumferential tapered protrusion 14 which abuts a like tapered recess in guide piece 15 which is secured to the outside wall 13 of the camera as shown in the drawing. A holding cap 16 is designed to abut circumferential protrusion 17 on collimator tube 11 and has a thread 18 which engages the thread on guide piece 15 so that tapered protrusion 14 will be in positive contact with the matched recess in guide piece 15.

Similarly, exit port assembly 12 is provided with a like circumferential tapered protrusion 19 which abuts a tapered recess in guide piece 20 which is similarly secured to the outer wall 13 of the camera. A holding cap 21 is designed to abut circumferential protrusion 22 on exit port assembly 12 and has a thread 23 which engages a thread on guide piece 20 so that tapered protrusion 19 will be in positive contact with the matched recess in guide piece 20.

Collimator 11 is provided with partitions 27 and 28 which are impervious to X-radiation, positioned perpendicular to the center line of the collimator and are apertured to permit X-radiation to pass therethrough in a sharply defined beam. The form of the apertures in the partitions will depend upon the nature of the specimen and the results desired. In the preferred embodiment shown in Fig. 1, the aperture in partition 27 is in the form of a slot as shown in Fig. 1A. When high intensities are required without sacrificing resolution in the 10° to 270° 2θ region, and line shape is of no importance, the better combination in a small or large camera is a slotted aperture in partition 27 as shown in Fig. 1A and a circular aperture in partition 28. Circular apertures in both partitions 27 and 28 are desirable for those cases where line shape is important and for very small angle patterns particularly where sharp clear lines in the diffraction pattern are necessary. While for certain types of specimens, e. g. specimens with large interplanar spacings, a circular aperture in partition 27 and a slotted aperture in partition 28 gives better results. In this case, the slot in partition 28 should be dimensioned so that the cross-sectional area of the beam of X-radiation in the vicinity of the specimen is in the form of a square.

With certain X-ray tubes with good focussing in the X-ray tube itself and in which the target can be viewed at small angles such that the projection of the focal spot corresponds to a slit approximately 0.5 millimeter by 2 millimeters or less wide, the first aperture 27 can be eliminated and the focal spot can replace the slit in apertured partition 27. This will result in higher intensities and a simpler collimating system.

The distance from the apertured partition 28 to the tip of collimator tube 11 forms a scatter cup 29 which is provided to prevent secondary scatter effects arising from the primary beam of X-radiation striking the apertured walls in partition 28.

A fluorescent screen 26 is provided at the remote end of exit port tube 12 so that the alignment of the primary beam and the specimen can be readily checked at any time. A disc of black paper 25 located on the specimen side of screen 26 prevents light from entering the camera and exposing film 33. A leaded glass plate 24 is located in front of screen 26 to protect the operator against exposure to direct radiation.

The tapered recesses in guide pieces 15 and 20 respectively are provided for automatically aligning collimator 11 and exit port assembly 12 with specimen 10. Guide pieces 15 and 20 are fixed to the camera after they have been carefully adjusted to assure the positive and automatic alignment of collimator 11 and exit port assembly 12 with specimen 10. The tapered recesses provide a conical fit with the tapered protrusions of the collimator and exit port tube assembly respectively. In this manner, the alignment of the collimator tube 11 and exit port assembly 12 is simply and positively assured. In addition, threaded caps 16 and 21 securely position collimator tube 11 and exit port tube assembly 12 when they are properly aligned. The openings in the camera have internal diameters which are slightly larger than the external diameters of the collimator tube and exit port tube respectively so that there is no interference while the collimator tube and exit port tube are being aligned.

An alignment pin 32 for aligning the slotted aperture in partition 27 parallel to specimen 10 is positioned by bracket 31 attached to the camera housing. When pin 32 is moved, the end of the pin is freed from a recess 30 in the outer wall of the collimator tube thus permitting the collimator tube to be rotated or removed from the camera housing. With the collimator tube inserted into the opening in the camera housing, pin 32 will automatically slip into recess 30 when the slotted aperture in partition 27 is parallel to the specimen and will be held in position by spring 34.

In order to obtain optimum operating results with the collimating system, it is necessary that certain conditions be fulfilled concerning the basic design of the system. More particularly, the important factors are the spacing of the partitions, the external diameters of the collimator and exit port tubes, the size of the apertures in the partitions, and the size of the respective orifices of the collimator and exit port tube at the specimen ends thereof. These relations can be obtained from a study of the geometry of the collimating system.

The fulfillment of the conditions imposed above can best be determined by a study of the analytical diagram shown in Fig. 2 of the drawing. In the figure, the symbols define the following relations:

$x$ is the distance between apertures $P_1$ and $P_2$ located in partitions 27 and 28 of Figure 1 respectively;

$ax$ is the distance between aperture $P_1$ and the cross over point K;

$bx$ is the distance between aperture $P_2$ and the cross over point K for the primary radiation entering the collimator tube through aperture $P_1$;

$y$ is the distance between aperture $P_2$ and the specimen end of the collimator tube;

C is the altitude of a triangle EGH whose base is the diameter of the film opening through which the collimator tube is inserted into the camera and the sides of which include the sides of a similar triangle LJH having a base S which is the diameter of the specimen, triangles EGH and LJH having a common vertex H; $C_1$ is the altitude of a triangle $E_1G_1H_1$ whose base $E_1G_1$ is the diameter of the film opening through which the exit port tube is inserted into the camera, the sides of which include the sides of a similar triangle $LJH_1$ having a base S which is the diameter of the specimen, triangles $E_1G_1H_1$ and $LJH_1$ having a common vertex $H_1$;

$P_1$ is the width or diameter of the aperture in partition 27 of Fig. 1;

$P_2$ is the diameter of the aperture in partition 28 of Fig. 1;

F is the diameter of film opening EG and/or $E_1G_1$;

B is the diameter of the X-ray beam at the collimator tip;

$B_1$ is the diameter of the X-ray beam at the specimen end of the exit port tube;

Z is the distance between the specimen end of the exit port tube and the film opening $E_1G_1$;

W is the wall thickness of the collimator tube at the orifice of the collimator nearest the specimen;

T is the difference between the beam diameter and the internal diameter of the collimator tube at the specimen end of the collimator tube;

$n$ is the distance between aperture $P_1$ and film opening EG; if the partition 27 is omitted and an X-ray tube having a target which can be viewed at small angles is used, $n$ is the distance between film opening EG and the focal spot;

S is the diameter of the specimen;

D is the internal diameter of the camera.

For a camera of any given design, certain of the above factors are determined by the design characteristics of the camera. For any given camera and specimen, D, S, W, T, and F are predetermined by the camera and specimen. These factors can be stated as the parameters of the system. If it be assumed further that $$P_1 = P_2 = P$$

(though not absolutely necessary, it leads to certain simplifications in the mathematical relations and is in most cases a true relationship), the following relationships will be readily apparent from the geometry of the figure:

The distance $x$ between apertures is equal to $$x = ax + bx \qquad (1)$$

The inside diameter $D_1$ of the collimator tube at the specimen end is:

$$D_1 = B + T \qquad (2)$$

The outside diameter $D_2$ of the collimator tube at the specimen end is:

$$D_2 = B + T + W \qquad (3)$$

The beam diameter B at the end of the collimator tube may be determined from the similar triangles formed by aperture $P_2$ and the beam diameter B with cross-over point K $$\frac{P_2}{bx} = \frac{B}{bx + y} \qquad (4)$$

whence $$B = \frac{P(bs + y)}{bx}$$

The length of the collimator tube from apertures $P_1$ to the tip of the collimator tube is $x\, y$ and can be expressed as follows:

$$\frac{F}{C} = \frac{B + T + W}{C + n - (x + y)} \qquad (5)$$

whence $$x + y = \frac{CD_2 - F(C + n)}{-F}$$

The location of the aperture $P_2$ nearest the specimen is found by the method of similar triangles using triangles $RMG_1$ and RUV, or, $$\frac{\tfrac{1}{2}F + \tfrac{1}{2}P_2}{D + n - x} = \frac{\tfrac{1}{2}B + \tfrac{1}{2}P_2 + \tfrac{1}{2}T}{y}$$

whence $$Y = \frac{(D_1 + P)(D + n - x)}{P + F} \qquad (6)$$

Since Equations 4, 5 and 6 contain the variables $x$, $y$, and B, these equations must be solved simultaneously for the solution of each of the variables. The generalized solution in parametric form yields an unwieldy solution and since for any given camera, the constants are determined, the solution of these equations is simplified by the substitution of known constants.

Likewise, for the exit port tube, the following relations hold. The inside diameter $D_3$ of the exit port tube at the specimen end thereof is:

$$D_3 = B_1 + T \qquad (7)$$

and the outside diameter at the specimen end thereof is:

$$D_4 = B + T + W \qquad (8)$$

The diameter $B_1$ of the beam at the specimen end of the exit port tube is determined from the similar triangles formed by aperture $P_2$ and the beam diameter $B_1$ with cross-over point K:

$$\frac{P_2}{bx} = \frac{B_1}{(D + n - Z - ax)}$$

whence $$B_1 = P\frac{(D + n - Z - ax)}{bx} \qquad (9)$$

And the length Z of the exit port tube can be expressed as follows:

$$\frac{F}{C_1} = \frac{(B_1+T+W)}{(C_1-Z)}$$

whence $$Z = \frac{C_1(D_4-F)}{F} \qquad (10)$$

The simultaneous solution of Equations 9 and 10 will yield the length Z of the exit port tube and the beam diameter $B_1$, for optimum results.

While we have shown and described an X-ray collimating system for use in a cylindrical X-ray powder camera, the equations formulated above are equally applicable to any camera employed in X-ray diffraction analysis of powder specimens. More particularly, a flat plate camera or a Geiger-Müller tube could be employed instead of a cylindrical X-ray powder camera in which case the parameters would be defined in terms of the system employed. In such applications of the collimating system described above, the diameter of the camera will become the distance to the recording medium and the diameter of the film opening will be equivalent to the minimum Bragg angle, $\theta$, that can be recorded with the system.

With a collimating system described and designed in accordance with the generalized parametric equations, the camera embodying the collimating system will be characterized by high radiation intensities for specimen analysis resulting in clear sharply defined images; good resolution of the diffraction permitting small angle work with highly resolved diffraction patterns on the film; low background scatter effect resulting in sharp clear images on the film; no primary radiation effects on the film; perfect alignment of the collimator tube, exit port tube, and specimen axis; and simple and easily reproducible alignment.

While we have thus described our invention with specific examples and embodiments thereof, we do not wish to be limited thereto because other obvious modifications of the invention will be apparent to those skilled in the art.

What we claim is:

1. A collimating system adapted for use in an X-ray powder camera employed for recording X-ray diffraction patterns of a specimen of powdered material on a film, comprising a tubular member having a conically tapered portion for directing a beam of X-radiation along a given axis at said specimen, a first wall element perpendicular to the given axis provided with an aperture, a second wall element perpendicular to the given axis provided with an aperture, said second wall element positioned within said tapered portion of said tubular member to provide a portion of said first tubular member for absorbing deflected X-radiation from said wall element, the position of said second wall element being located according to the following equation, $$y = \frac{(D_1+P)(D+n-x)}{P+F}$$

where $y$ is the distance from the second wall element to the end of said first tubular member nearest the specimen, $D_1$ is the internal diameter of the first tubular member at the specimen end thereof determined according to the following relation, $$D_1 = B+T$$

where B is the beam diameter at the end of the first tubular member at the specimen end thereof and is further determined according to the following relation $$B = P\frac{(bx+y)}{bx}$$

where P is the diameter of the aperture in said second wall element, $bx$ is the distance from said second wall element to a cross-over point of a beam of X-radiation between said first and second wall elements, T is the diameter difference between the beam and the first tubular member at the specimen end of said first tubular member, D is the diameter of said powder camera, $n$ is the distance from the film opening in said camera to said first wall element, F is the film opening diameter, and $x$ is the distance between said first and second wall elements being defined by the following relation, $$x+y = \frac{CD_2 - F(c+n)}{-F}$$

where $D_2$ is the external diameter of the first tubular member at the specimen and thereof and is defined by the following relation, $$D_2 = B+T+W$$

where W is the wall thickness of the first tubular member, C is the altitude of the cone whose base is the diameter of the film opening and which cone determines the conical taper of said first tubular member, and a second tubular member having a conically tapered portion directed at said specimen axially aligned in spaced relation with said first tubular member and said specimen, the length of said tubular member being defined by the following relation, $$Z = \frac{C_1(D_4-F)}{F}$$

where $C_1$ is the altitude of the cone defining the conical taper of said second tubular member and whose base is the diameter of the film opening F, and $D_4$ is the outside of diameter of said second tubular member defined by the following relation $$D_4 = B_1+T+W$$

where T and W have been defined as above, and $B_1$ is defined by the following relation $$B_1 = P\frac{(D+n-Z-ax)}{bx}$$

where $ax$ is defined as the distance from the first wall element in said first tubular member to the cross-over point of a beam of X-radiation in said first tubular member and D is the diameter of said camera.

2. A collimating system adapted for use in an X-ray powder camera employed for recording X-ray diffraction patterns of a specimen of powdered material on a film as claimed in claim 1, in which the second tubular member includes means for observing axial alignment of the first and second tubular members, said alignment determining means including a fluorescent screen responsive to incident X-radiation thereon for giving a visual indication of the alignment of said tubular members when a beam of X-radiation is directed therethrough.

3. A collimating system adapted for use in an X-ray powder camera employed for recording X-ray diffraction patterns of a specimen of powdered material on a film as claimed in claim 1, including a conically tapered protrusion at one end of each of said tubular members comprising the collimating system which are adapted to abut corresponding internally tapered guide block members secured to the exterior of the camera for aligning the tubular members, and means for observing axial alignment of the first and second tubular members including a fluorescent screen responsive to incident radiation thereon for giving a visual indication of the alignment of said tubular members when a beam of X-radiation is directed therethrough.

WILLIAM PARRISH.
EVELYN A. CISNEY.

REFERENCES CITED

The following references are of record in the file of this patent:

UNITED STATES PATENTS

| Number | Name | Date |
| --- | --- | --- |
| 2,025,488 | Yap | Dec. 24, 1935 |
| 2,317,329 | McLachlan, Jr. | Apr. 20, 1943 |
| 2,380,236 | Harker | July 10, 1945 |
| 2,386,785 | Friedman | Oct. 16, 1945 |

FOREIGN PATENTS

| Number | Country | Date |
| --- | --- | --- |
| 670,322 | Germany | Aug. 28, 1932 |

OTHER REFERENCES

"Journal of Scientific Instruments," vol. 18, 1941, pp. 216–219.

Structure of Metals by C. S. Barrett, McGraw-Hill Book Co., New York, published 1943, p. 115.